United States Patent
Zhao

(10) Patent No.: US 6,721,478 B2
(45) Date of Patent: Apr. 13, 2004

(54) DYNAMIC FIBER BRAGG GRATING

(75) Inventor: Ximin Zhao, San Jose, CA (US)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 24 days.

(21) Appl. No.: 10/162,857

(22) Filed: Jun. 4, 2002

(65) Prior Publication Data

US 2003/0223688 A1 Dec. 4, 2003

(51) Int. Cl.[7] .................................................. G02B 6/34
(52) U.S. Cl. ............................. 385/37; 385/10; 385/31
(58) Field of Search .............................. 385/10, 31, 37

(56) References Cited

U.S. PATENT DOCUMENTS 6,192,177 B1 * 2/2001 Amundson et al. ........... 385/37
6,282,340 B1 * 8/2001 Nasu et al. .................... 385/37
6,374,014 B1 * 4/2002 Jablonski ....................... 385/37
6,442,313 B2 * 8/2002 Yamauchi et al. ............ 385/37

* cited by examiner

*Primary Examiner*—Edward J. Glick
*Assistant Examiner*—Therese Barber
(74) *Attorney, Agent, or Firm*—Wei Te Chung

(57) ABSTRACT

A fiber Bragg grating (1) includes an optical fiber (2) having an optical fiber core (20) made of a material whose index of refraction varies with temperature, a thermal electric cooler (3) mounted on the optical fiber for maintaining "cold spots", and a resistor (4) including a plurality of micro heating elements (40) arranged on the optical fiber for forming periodic "hot spots". A temperature of the "hot spots" varies with a current flowing through the resistor, thereby controlling an index of refraction of narrow cross sections of the optical fiber core. Therefore, a state of reflection of the fiber Bragg grating can be tuned over a continuous range.

19 Claims, 2 Drawing Sheets

US 6,721,478 B2

DYNAMIC FIBER BRAGG GRATING

BACKGROUND OF THE INVENTION

1. Field of the Invention

The present invention relates to a fiber Bragg grating and, particularly, to a dynamic fiber Bragg grating whose state of reflection can be tuned over a continuous range.

2. Related Art

Conventionally, a fiber Bragg grating (FBG) is formed by exposing an optical fiber in a periodic UV light pattern generated either by two UV beams interfering or one UV beam passing through a phase mask. The materials composing the optical fiber core are photosensitive and absorb UV photons. When the materials absorb photons, the index of refraction (n) of the core increase. Thus, after a process of exposure, a periodic pattern will be present in the optical fiber core, regions that have absorbed UV light will have an increased index of refraction, and regions that have not absorbed UV light will have an unchanged index of refraction. When an incident light travels through the FBG, the wavelength, which meets the Bragg condition ($\lambda=2n_{eff}\Lambda$, where $n_{eff}$ is the effective index of refraction of the optical fiber core and $\Lambda$ is a pitch of the FBG which is the distance between two UV exposed areas), is reflected back (or rejected) by the FBG The reflection ratio of the FBG is determined by the length of the FBG and a difference in indexes refraction of the UV exposed and the non-exposed areas.

However, because the resulting pattern formed by exposure in the optical fiber core is permanent, the properties of the FBG, especially, the state of reflection of the FBG, is fixed by the UV exposure process and can not be tuned. Thus, this kind of FBG is static. Moreover, this kind of FBG requires optical fiber materials which are photosensitive, which essentially limits such FBGS to be made from silica-based materials.

Accordingly, an improved fiber Bragg grating is desired to overcome the above problems.

SUMMARY OF THE INVENTION

An object of the present invention is to provide a dynamic fiber Bragg grating (FBG) whose state of reflection can be tuned over a continuous range.

Another object of the present invention is to provide an FBG which can be based on a wide variety of material.

To achieve the above object, an FBG in accordance with a preferred embodiment of the present invention includes an optical fiber having an optical fiber core made of a material whose index of refraction varies with temperature, a thermal electric cooler mounted on the optical fiber for maintaining "cold spots", and a resistor including a plurality of micro heating elements arranged on the optical fiber for forming periodic "hot spots". A temperature of the "hot spots" varies with a current flowing through the resistor, thereby controlling an index of refraction of narrow cross sections of the optical fiber core. Therefore, a state of reflection of the fiber Bragg grating can be tuned over a continuous range.

These and additional objects, features and advantages of the present invention will become apparent after reading the following detailed description of a preferred embodiment of the invention taken in conjunction with the appended drawings.

BRIEF DESCRIPTION OF THE INVENTION

DETAILED DESCRIPTION OF THE INVENTION

Instead of utilizing the photosensitivity of different optical materials, as in the prior art, a fiber Bragg grating (FBG) in accordance with the present invention takes advantage of the fact that the index of refraction (n) of some optical materials varies with temperature. Both silica-based materials and many different optical polymers demonstrate such a relationship. For instance, the index of refraction, n, of silica increases with increasing temperature.

Referring to FIGS. 1–4, a fiber Bragg grating (FBG) 1 in accordance with a preferred embodiment of the present invention includes a cylindrical optical fiber 2 forming an optical fiber core 20 therein, a thermal electric cooler (TEC) 3 and a resistor 4.

The TEC 3 is mounted on one side of one section of the optical fiber 2, which side has been polished into a flat surface. The TEC 3 makes a good physical contact with the flat surface. A thin layer of thermal epoxy can be applied to the flat surface to ensure good thermal conductivity between the optical fiber 2 and the TEC 3. The TEC 3 acts as a heat sink and as a temperature controller to maintain the section of the optical fiber 2 at a pre-determined temperature.

Figure 1:
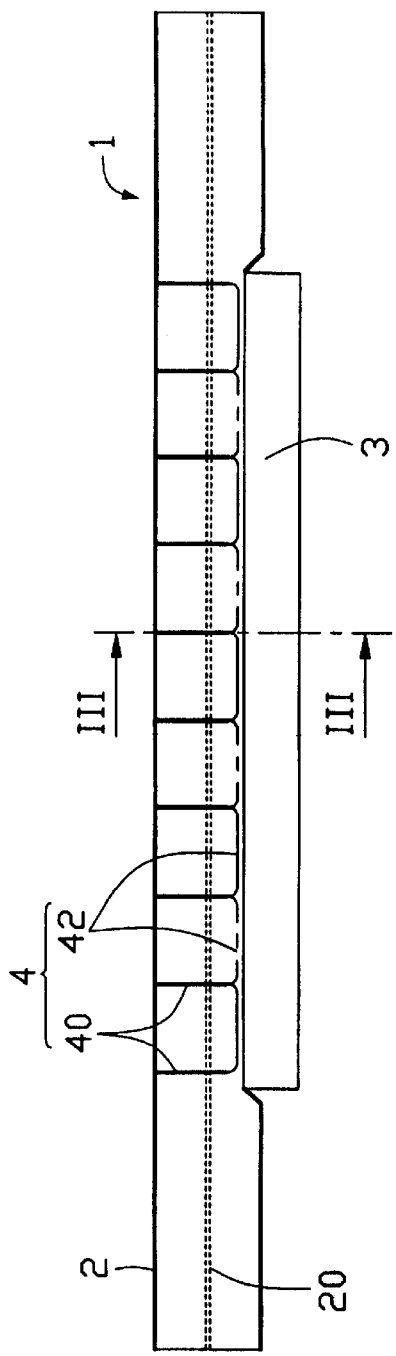
FIG. 1 is a side view of a fiber Bragg grating (FBG) according to the present invention.
Figure 2:
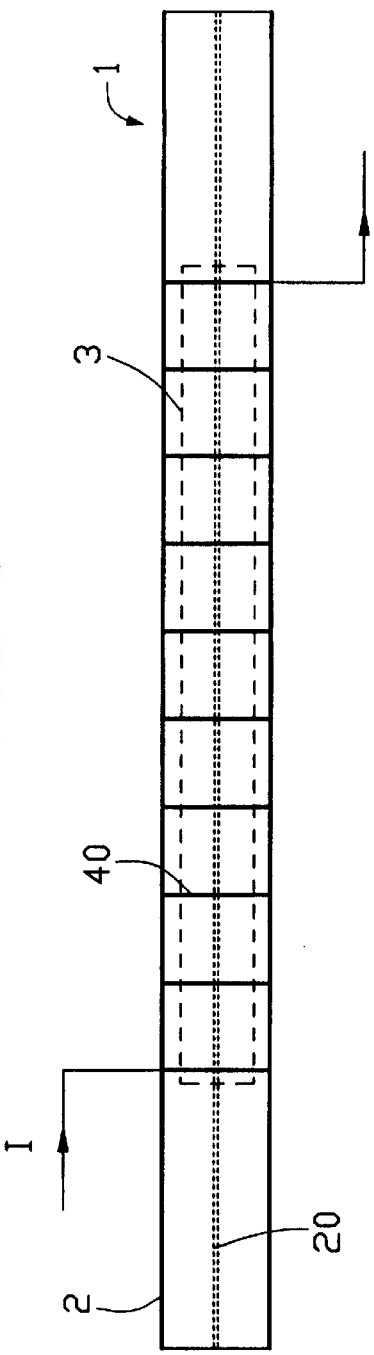
FIG. 2 is a top view of the FBG of FIG. 1.
Figure 3:
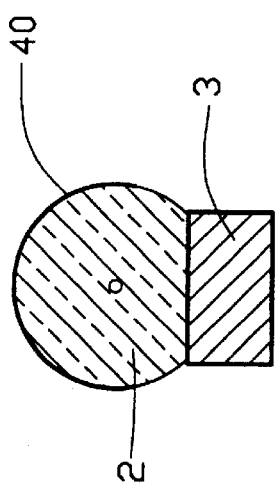
FIG. 3 is a cross-sectional view of the FBG of FIG. 1, taken along line III—III of FIG. 1.
Figure 4:
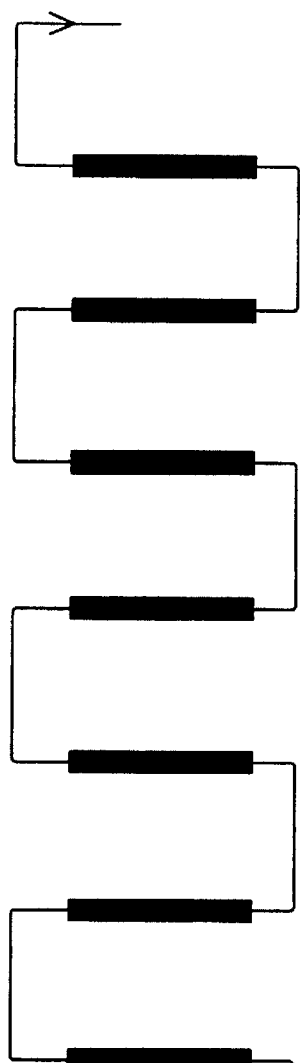
FIG. 4 is a schematic diagram of connected micro heating elements of a resistor of the FBG of FIG. 1.

Referring FIG. 4, the resistor 4 includes a plurality of micro heating elements 40 and a plurality of bonding wires 42 connecting the micro heating elements 40 together. The micro heating elements 40 are evenly deposited on an outside surface of the optical fiber 2 by deposition or photolithography, each one having the shape of the letter "C", with an opening thereof facing the TEC 3 (see FIG. 3). Each micro heating element 40 can be a very thin layer of metal or other material that conducts current. The micro heating elements 40 are connected in series by the bonding wires 42, that is, one end of a micro heating element 40 is wire bonded to a neighboring heating element 40 in front of it by one of the bonding wires 42, while the other end is wire bonded to another neighboring heating element 40 behind it by another bonding wire 42 (see FIG. 4). Thus, the same current flows through all the micro heating elements 40 in a zigzag fashion. Because the micro heating elements 40 are resistive, heat will be generated by the micro heating elements 40 when current flows through them.

When no current flows through the resistor 4, the section of the optical fiber 2 stays at one, uniform temperature (the same as that of the TEC), thus the index of refraction (n) of the fiber core 20 is uniform, and no Bragg Grating effect will affect light transmitting through the optical fiber 2 when it reaches the section with the TEC 3. This state is called "all pass" state.

When a current I flows through the resistor 4, however, each micro heating element 40 of the resistor 4 will generate heat at a constant rate as long as the current I remains constant. Each micro heating element 40 raises the temperature in a cross section of the optical fiber 2 that sits directly beneath each micro heating element 40 and very close to either side of said cross section. The cross sections of the optical fiber 2 which are between the micro heating elements 40 remain at a temperature approximately the same as that of the TEC 3, since the TEC 3 has a much larger contacting area with the optical fiber 2 than the micro heating elements

40 have, and since the TEC 3 has a large heat transfer capacity. Hence, a series of uniform, evenly distributed "hot spots" develops along the optical fiber 2 when a current flows in the micro heating elements 40. Because the index of refraction of the materials in the optical fiber core 20 varies with temperature, a periodic pattern of indexes of refraction varying between two values is generated inside the optical fiber core 20, with an index of refraction in the "hot spots" being different from that in the unheated areas. This periodic variation in the index of refraction constitutes a fiber Bragg grating (FBG). A distance between adjacent "hot spots" is the pitch (A) of the FBG 1, which determines what wavelength is most strongly reflected by the FBG 1.

Different values of current heat the "hot spots" to different temperatures, thus changing a difference between the indexes of refraction in the heated and in the un-heated areas. Because the reflection ratio of incident light of an FBG is determined by the difference in indexes of refraction in the "hot" areas and in the "cold" areas, and by the length of the grating, then by choosing the temperature of the TEC 3, as well as the length of the grating area, we can find a reasonable driving current ($I_{max}$) whereat nearly 100% reflection can be achieved for the wavelength that meets the Bragg condition. The state of the FBG at this driving current value is called the "all reflect" state. From this state, a decrease in the driving current will cause that particular wavelength of the incident light to be partially reflected and partially passed.

Thus, the present invention, for a particular wavelength that meets the Bragg condition at a particular current, the FBG can achieve an "all reflect" (100% reflection) when $I=I_{max}$, an "all pass" (100% pass) when I=0, and a "partial reflection" (thus partially pass state) when $0<I<I_{max}$, by choosing different driving currents. Therefore, the FBG of the present invention functions as a dynamic fiber Bragg grating.

Although the present invention has been described with reference to a specific embodiment thereof, the description is illustrative and is not to be construed as limiting the invention. Various modifications to the present invention may be made to the preferred embodiment by those skilled in the art without departing from the true spirit and scope of the invention as defined by the appended claims.

I claim:

1. A fiber Bragg grating comprising:
   an optical fiber having an optical fiber core therein made of a material whose index of refraction (n) varies with temperature;
   a thermal electric cooler (TEC) mounted on the optical fiber for maintaining a section of the optical fiber at a pre-determined temperature; and
   a resistor including a plurality of micro heating elements, arranged on an outside surface of the optical fiber for forming a plurality of periodically located "hot spots".

2. The fiber Bragg grating as claimed in claim 1, wherein the TEC is mounted on one side of the section of the optical fiber and said side is polished into a flat surface, and the TEC makes uniform physical contact with the flat surface.

3. The fiber Bragg grating as claimed in claim 1, wherein the micro heating elements are deposited in a periodic pattern along the outside surface of the optical fiber.

4. The fiber Bragg grating as claimed in claim 3, wherein each micro heating element has a "C" shape, with an opening thereof facing the TEC.

5. The fiber Bragg grating as claimed in claim 4, wherein the resistor further includes a plurality of bonding wires connecting the micro heating elements together in series.

6. The fiber Bragg grating as claimed in claim 5, wherein the resistor conducts a current, and when a current flows in the resistor, the temperature in cross sections of the optical fiber located directly beneath each micro heating element will rise, forming the plurality of "hot spots".

7. The fiber Bragg grating as claimed in claim 6, wherein the index of refraction of the optical fiber core directly beneath each micro heating element varies with the current conducted through the resistor.

8. A method for forming a fiber Bragg grating, comprising the steps of:
   (1) providing an optical fiber having an optical fiber core therein, the optical fiber core being made of a material whose index of refraction changes with changes in temperature;
   (2) providing a thermal electric cooler (TEC);
   (3) mounting the TEC on the optical fiber for maintaining "cold spots" on the optical fiber; and
   (4) forming a current-conducting resistor on an outside surface of the optical fiber, which includes a plurality of micro heating elements, the micro heating elements being deposited onto the outside surface of the optical fiber in a uniformly spaced pattern, for forming "hot spots" when a current flows through the resistor.

9. The method as claimed in claim 8, wherein step (3) further includes polishing a side of a section of the optical fiber into a flat surface and mounting the TEC on the flat surface.

10. The method as claimed in claim 9, wherein the TEC makes uniform physical contact with the flat surface.

11. The method as claimed in claim 8, wherein step (4) further includes forming each of the micro heating elements in the shape pf the letter "C" on the outside surface of the optical fiber, with an opening facing the TEC.

12. The method as claimed in claim 11, wherein step (4) further includes depositing the micro heating elements onto the optical fiber by a metal deposition or a photolithography process.

13. The method as claimed in claim 12, wherein the resistor further includes a plurality of bonding wires for electrically connecting the micro heating elements together.

14. The method as claimed in claim 8, wherein temperature of the "hot spots" varies with the magnitude of the current passing through the resistor thereby controlling the index of refraction of the optical fiber core in the areas directly beneath the micro heating elements.

15. A fiber Bragg grating arrangement comprising:
   an optical fiber having thereof an optical fiber core made of material with index of refraction varying with temperature;
   a thermal maintenance device attached to a section of said optical fiber; and
   a thermal variation device attached to said section and resulting in temperature change intermittently along said section; wherein
      with cooperation of the thermal maintenance device and the thermal variation device said section defines so-called "hot-spot" regions and so-called "cold-spot" regions alternatively arranged along said section.

16. The arrangement as claimed in claim 15, wherein said thermal maintenance device is a thermal cooler to remove excessive heat from the fiber beyond a pre-determined temperature.

17. The arrangement as claimed in claim 15, wherein said thermal variation device is a resistor generating heat via current flow.

18. The arrangement as claimed in claim 15, wherein a distance between two adjacent hot-spot regions determines a wavelength strongly reflected by the optical fiber.

19. A method of making a reflection tunable optical fiber, comprising steps of:

providing an optical fiber having an optical fiber core characterized to define an index of refraction varying based on temperature change;

providing a plurality of micro heating elements arranged along a section of the fiber with intervals; and providing a source to adjustably activate said micro heating elements to establish so-called "hot-spot" and "cold-spot" alternately arranged along said section thus resulting in variable index of refraction ranged from all pass to all reflection for incoming light.

* * * * *